(12) United States Patent
Teeter et al.

(10) Patent No.: US 6,738,314 B1
(45) Date of Patent: May 18, 2004

(54) AUTONOMOUS MINE NEUTRALIZATION SYSTEM

(75) Inventors: Michael A. Teeter, West Hills, CA (US); Kip Harrington, Santa Clarita, CA (US)

(73) Assignee: L3 Communications Corporation, Sylmar, CA (US)

( * ) Notice: Subject to any disclaimer, the term of this patent is extended or adjusted under 35 U.S.C. 154(b) by 0 days.

(21) Appl. No.: 10/357,311

(22) Filed: Jan. 31, 2003

(51) Int. Cl.[7] ............................................... H04B 11/00
(52) U.S. Cl. ...................................................... 367/131
(58) Field of Search ................................. 367/131, 133, 367/134, 3; 114/21.1, 21.2; 89/1.13

(56) References Cited

U.S. PATENT DOCUMENTS

| | | |
|---|---|---|
| 3,783,441 A | 1/1974 | Slawsky |
| 3,946,696 A | 3/1976 | Lubnow ................. 114/221 R |
| 4,004,265 A | 1/1977 | Woodruff et al. |
| 4,141,295 A | 2/1979 | Campbell et al. ............ 102/10 |
| 4,315,326 A | 2/1982 | Chase, Jr. ................... 367/134 |
| 4,473,896 A * | 9/1984 | Loeser et al. ............... 367/131 |
| 5,012,717 A | 5/1991 | Metersky et al. ............ 89/1.11 |
| 5,020,032 A | 5/1991 | Dale et al. ..................... 367/4 |
| 5,099,746 A | 3/1992 | Gustavsson et al. ......... 89/1.11 |
| 5,119,341 A | 6/1992 | Youngberg ..................... 367/5 |
| 5,291,194 A | 3/1994 | Ames .......................... 340/850 |
| 5,377,164 A | 12/1994 | Almström et al. .......... 367/131 |
| 5,379,034 A | 1/1995 | O'Connell ................... 340/850 |
| 5,442,358 A | 8/1995 | Keeler et al. ................. 342/54 |
| 5,579,285 A | 11/1996 | Hubert ........................ 367/133 |
| 5,646,366 A | 7/1997 | O'Connell ................. 114/21.2 |
| 5,748,102 A | 5/1998 | Barron ........................ 340/850 |
| 5,749,312 A | 5/1998 | Hillenbrand et al. ....... 114/21.2 |
| 5,844,159 A | 12/1998 | Posseme et al. ............. 89/1.13 |

* cited by examiner

*Primary Examiner*—Daniel T. Pihulic
(74) *Attorney, Agent, or Firm*—Roberts & Roberts, LLP

(57) ABSTRACT

An autonomous mine detection and neutralization system including a motorized underwater vehicle having a guidance control component, and a vehicle positioning system attached to the vehicle via a communications cable. The system also includes a buoyant surface unit comprising a protective housing surrounding an interior chamber, a positive buoyancy buoy attached to the housing, an antenna system attached to the housing, and a radio transmitter and receiver system positioned within the chamber, which radio transmitter and receiver system is electrically attached to the vehicle positioning system and the antenna system. The mine detection system is launched into a body of water from an air craft or surface vessel. The vehicle then proceeds to an underwater target on its own, relaying navigation data and imagery through a communications cable to a surface unit which relays the information over a radio frequency link to a remote user.

21 Claims, 3 Drawing Sheets

AUTONOMOUS MINE NEUTRALIZATION SYSTEM

BACKGROUND OF THE INVENTION

1. Field of the Invention

The present invention relates generally to underwater mine detection. More particularly, the invention relates to an autonomous system for the detection and neutralization of sea mines.

2. Description of the Related Art

Neutralization of sea mines continues to be a major priority for most countries requiring naval access for defense or commerce. Existing approaches to sea mine neutralization are notoriously slow, inefficient, and dangerous. One known method includes a surface vessel which tows a mine neutralizing device which is linked to the vessel via an electrical wire or fiber optic communication link. The device locates and then neutralizes underwater mines. However, one drawback of this method is that the vessel must remain nearby during the mine neutralization operation, to enable recovery of the mine neutralizing device and to provide human operator support. Unfortunately, this practice often endangers both the mine neutralizing personnel and equipment.

More recently, expendable mine neutralizing devices have been developed which eliminate the requirement for an air or sea vessel to remain nearby for device recovery. However, vessels must still remain relatively close to the mine neutralizing device to enable human operators to receive real-time imagery and sonar data from the device. Thus, the possibility of human casualties or damage to equipment is still present.

It would therefore be desirable to devise a mine neutralizing device which is autonomous from an air or sea vessel, and can relay relevant information to human operators from farther distances. The present invention provides a solution to this problem. This invention provides improvements in both speed and safety of mine neutralization, and thus has military and commercial significance.

The invention provides a mine detection system which includes a motorized underwater vehicle having a guidance control component, and a vehicle positioning system attached to the vehicle via a communications cable. The system also includes a buoyant surface unit comprising a protective housing surrounding an interior chamber, a positive buoyancy buoy attached to the housing, an antenna system attached to the housing, and a radio transmitter and receiver system positioned within the chamber, which radio transmitter and receiver system is electrically attached to the vehicle positioning system and the antenna system.

The mine detection system is preferably launched from an air craft or surface vessel, and left behind while the craft or vessel continues on with a mission. The neutralization device then proceeds to an underwater target on its own, relaying relevant navigation data and imagery through a communications cable to a surface unit which, in turn, relays the information over a radio frequency link to a remote user on the support craft or vessel. Thus, human operators can monitor and control the mission at a safe distance from the mine.

SUMMARY OF THE INVENTION

The invention provides an underwater vehicle command and locating system comprising:
a) a motorized underwater vehicle comprising a guidance control component;
b) a vehicle positioning system attached to the vehicle via a communications cable; and
c) a buoyant surface unit comprising:
  i) a protective housing surrounding an interior chamber;
  ii) a positive buoyancy buoy attached to the housing;
  iii) an antenna system attached to the housing; and
  iv) a radio transmitter and receiver system positioned within the chamber, which radio transmitter and receiver system is electrically attached to the vehicle positioning system and the antenna system.

The invention further provides a method for commanding an underwater vehicle, comprising the steps of:
I) providing an underwater vehicle command and locating system comprising:
  a) a motorized underwater vehicle comprising a guidance control component;
  b) a vehicle positioning system attached to the vehicle via a communications cable; and
  c) a buoyant surface unit comprising:
    i) a protective housing surrounding an interior chamber;
    ii) a positive buoyancy buoy attached to the housing;
    iii) an antenna system attached to the housing; and
    iv) a radio transmitter and receiver system positioned within the chamber, which radio transmitter and receiver system is electrically attached to the vehicle positioning system and the antenna system;
II) deploying the underwater vehicle command and locating system into a body of water;
III) determining the location of the underwater vehicle within the body of water, via the vehicle positioning system;
IV) receiving data from the underwater vehicle, via the radio transmitter and receiver system, which data enables a user to locate an underwater target;
V) communicating with the underwater vehicle to thereby direct the underwater vehicle toward the underwater target; and
VI) destroying the underwater target.

The invention still further provides an underwater mine detection assembly which comprises:
a) a motorized underwater vehicle comprising a guidance control component;
b) an acoustic vehicle positioning system attached to the vehicle via a communications cable; and
c) a buoyant surface unit comprising:
  i) a protective housing surrounding an interior chamber;
  ii) a positive buoyancy buoy attached to the housing;
  iii) an antenna system attached to the housing;
  iv) a radio transmitter and receiver system positioned within the chamber, which radio transmitter and receiver system is electrically attached to the vehicle positioning system and the antenna system;
  v) a battery within the interior chamber of the surface unit, which battery is attached to the vehicle positioning system, and the radio transmitter and receiver system; and vi) parachute compartment within the interior chamber of the surface unit, which parachute compartment contains a deployable parachute.

DETAILED DESCRIPTION OF THE PREFERRED EMBODIMENT

The invention provides an underwater vehicle command and locating system, hereinafter referred to as a "mine detection system". The purpose of the mine detection system is to transit an underwater vehicle to within close proximity of a target with sufficient accuracy to enable the vehicle to autonomously detect the target with high probability, and direct the vehicle to the target. The system of the invention may be used for the detection and destruction of various types of targets in various environments including moored, close tethered, and bottom targets in shallow to deep water having a wide range of underwater sound propagation quality. Variations in underwater sound propagation quality are often due to variations in water depth, temperature as a function of depth, and salinity. Underwater sound propagation quality, hereinafter referred to as "acoustics", ranges from very poor to very good, depending on environmental conditions.

Figure 1:
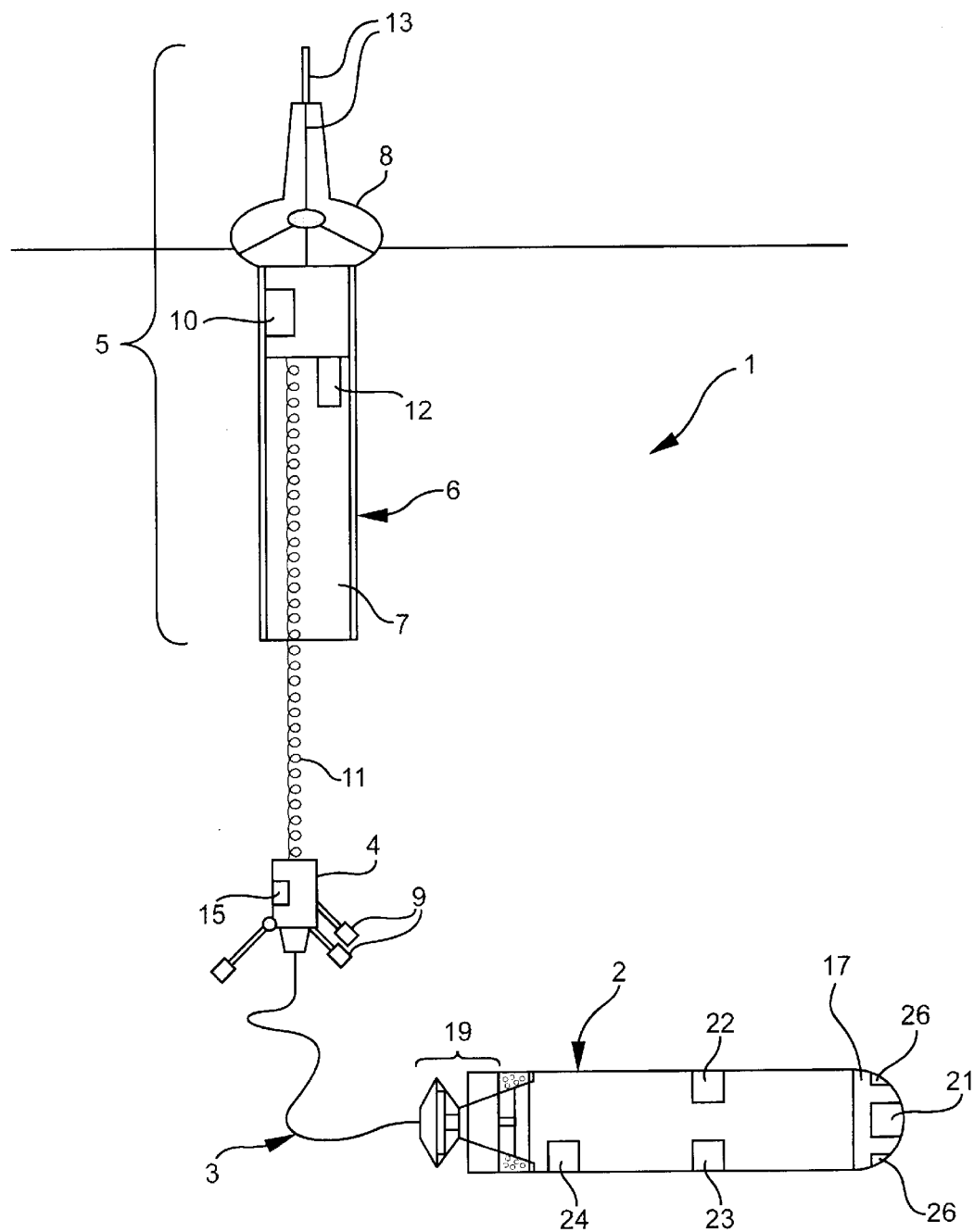
FIG. 1 shows an exploded schematic view of an underwater vehicle command and locating system of the invention.
Figure 2:
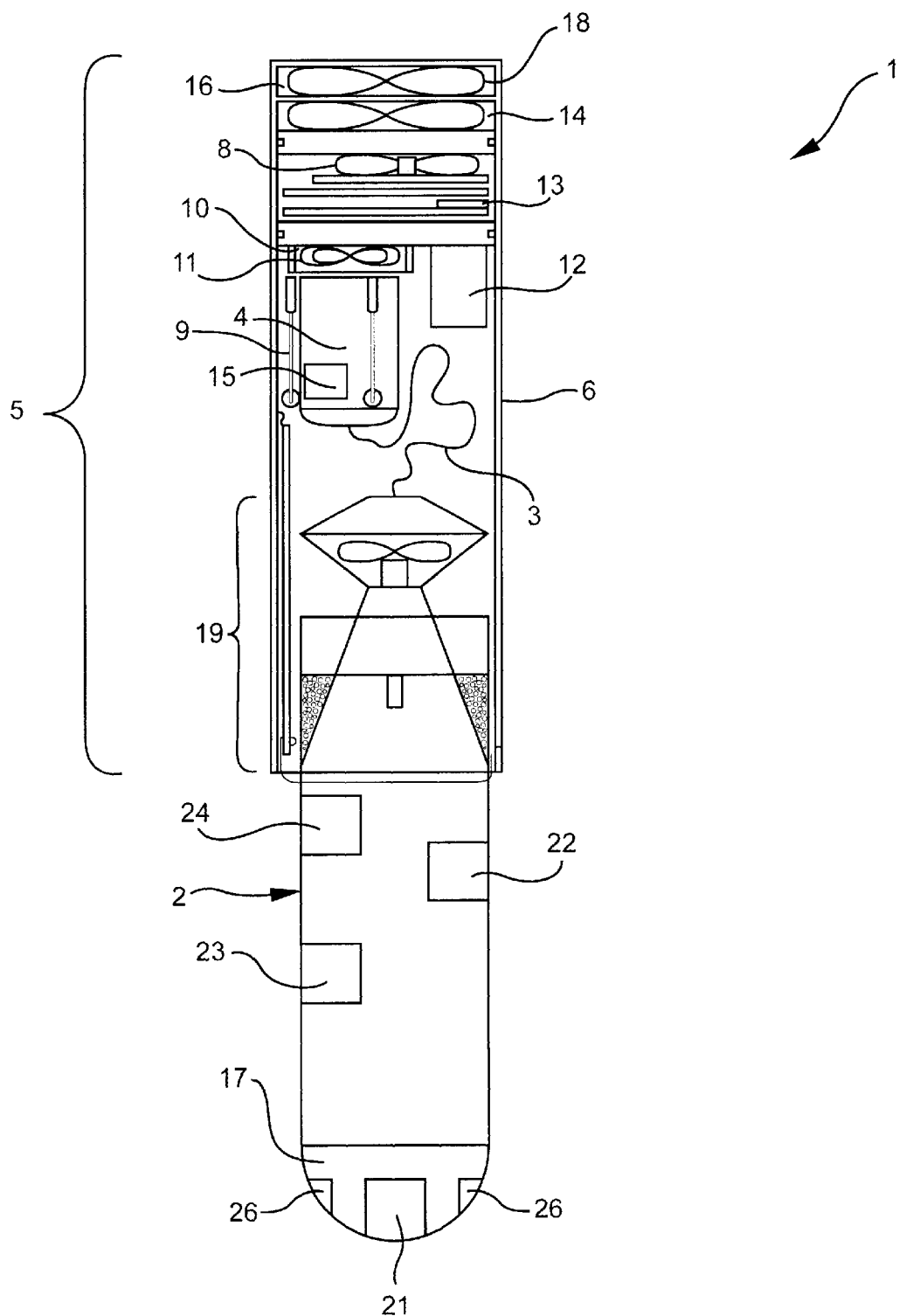
FIG. 2 shows a cut-away side view of an underwater vehicle command and locating system where the system's components are packed into the surface unit.
Figure 3:
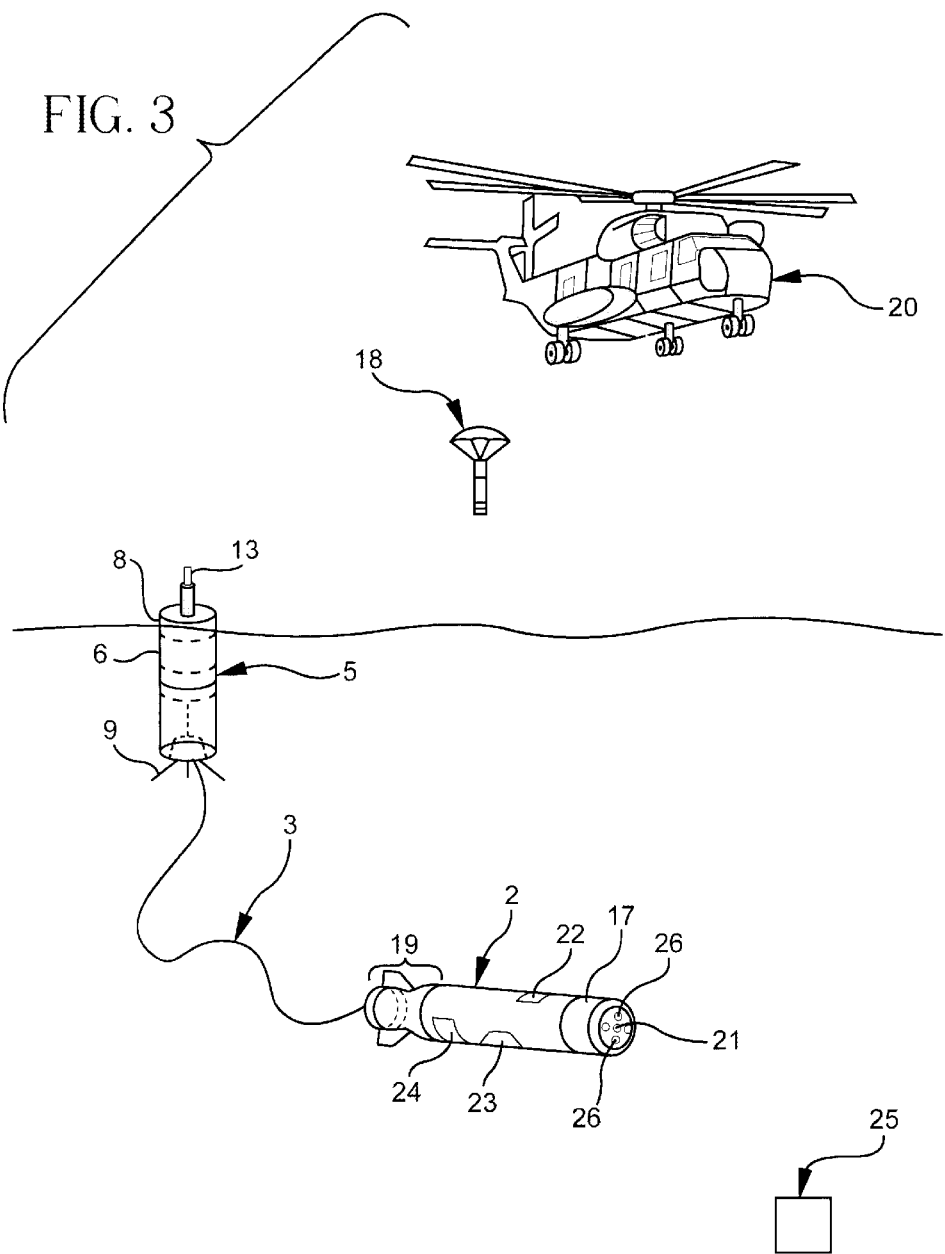
FIG. 3 shows a schematic view of an underwater vehicle command and locating system after deployment.

As shown in FIG. 1, the mine detection system 1 comprises a motorized underwater vehicle 2. Preferably, the underwater vehicle 2 is torpedo shaped. The underwater vehicle 2 comprises a vehicle guidance control component 19 for determining its position and controlling its direction of movement in a search operation. The guidance control component 19 is preferably capable of receiving commands from a user at a remote location, such as on land or on a plane, ship, or other vessel. The guidance control component of the vehicle, which serves to direct the motion of the vehicle, preferably includes a propulsion motor, propeller, elevator fins, rudder fins, collectively shown in FIG. 1 as 19, and an internal guidance computing component (not shown). The internal guidance computing component is preferably capable of receiving inputs, nonexclusively including vessel inputs such as desired vehicle heading, depth, and altitude; and vehicle sensor inputs such as heading, depth, altitude, pitch, roll, and speed. Outputs of the guidance computing component serve to control the movement of the underwater vehicle. In a preferred embodiment, the internal guidance computing component comprises a sonar directional system. As shown in FIGS. 2 and 3, his sonar directional system preferably comprises a target homing sonar 21, preferably on a nose of the underwater vehicle, an acoustic vehicle location pinger 22, preferably on a top side of the vehicle, and a combination function Doppler Velocity Log (DVL) and altimeter sonar 23, preferably located on an underside of the vehicle. The DVL portion of the sonar directional system performs an extension of the vehicle location function in cases where the acoustic signal from the pinger on the vehicle is degraded or cutoff from the vehicle locating sonar on the buoyant surface unit due to poor acoustics and the like. For example, under shallow (less than about 80 feet deep) warm water conditions, sound waves are bent such that the acoustic vehicle locating system on the buoyant surface unit may not be able to detect the acoustic pinger signal from the vehicle at horizontal distances greater than about 300 feet. At horizontal distances less than about 300 feet, the acoustic vehicle positioning system is used to track the vehicle position. At or near the end of this distance, the vehicle guidance control component takes over in keeping track of where the vehicle is located by integrating speed over time and providing vehicle distance and direction via magnetic compass traveled since the starting point. Other embodiments of the extended vehicle positioning system provided by the DVL sonar that operate in poor acoustics environments include: 1) an XYZ inertial measurement unit in the vehicle which senses the velocity and acceleration of the vehicle and calculates changes in vehicle position; and, 2) a high resolution bottom sonar that measures changes in vehicle position by sensing geometrical position of the vehicle with respect to stationary bottom features. Particularly, the vehicle is preferably tracked using X and Y velocity components over bottom outputs using the vehicle's DVL sonar. Thus, the useful tracking range of the acoustic vehicle positioning system is extended by the DVL in poor sonar conditions. The DVL also functions as a high accuracy vehicle altimeter.

The underwater vehicle 2 is preferably also capable of transmitting visual images to a remote user via one or more cameras 26 such as a charge coupled device (CCD) camera which may be either attached onto or mounted inside the underwater vehicle 2. Optionally but preferably, the underwater vehicle also comprises an explodable warhead 17 or other explosive device capable of destroying an underwater target such as a mine or the like once such has been located and identified.

A vehicle positioning system 4 is attached to the underwater motorized vehicle 2 via communications cable 3, as shown in FIG. 1. The vehicle positioning system 4 is capable of determining the location of the underwater vehicle 2 within a body of water. The vehicle positioning system is preferably capable of measuring the relative position in range, elevation angle, and azimuth angle from a positive buoyancy buoy 8 (described below) to the vehicle 2. In a preferred embodiment, the vehicle positioning system 4 comprises an acoustic receiver array 9, such as a short baseline acoustic system, which comprises a plurality of hydrophones or the like for receiving sonar signals from the underwater vehicle. Preferably, the acoustic receiver array 9 comprises at least 3 hydrophones arranged in a three dimensional array such that all possible arrival angles of a sonar signal from the vehicle to the buoy are received with sufficient horizontal separation to allow precise measurement of differences between sonar signal transit times or signal phases. The acoustic receiver array 9 may further comprise a magnetic compass (not shown) and pitch and roll sensors (not shown), which are attached to the hydrophone array to compensate for array motion.

Preferably, the vehicle positioning system 4 further comprises an acoustic tracking system computer 15. The acoustic tracking system computer 15 is preferably capable of receiving data inputs such as ping arrival times for each hydrophone of the acoustic receiver array 9 relative to the start-of-ping signal, compass heading, and pitch and roll. Outputs from the acoustic tracking system computer 15 nonexclusively include range, elevation angle, and azimuth angle from the vehicle positioning system 4 to the vehicle.

As stated above, the vehicle positioning system preferably further comprises an acoustic pinger 22 on or in the underwater vehicle which serves as a transmitter for the vehicle positioning system. The vehicle positioning system also preferably comprises an acoustic tracking system computer (not shown) which serves to compute range, azimuth, and elevation from the buoy 8 (described below) to the vehicle 2.

As stated above, the vehicle positioning system 4 is attached to the underwater vehicle 2 via a communications cable 3. The communications cable 3 is capable of conducting data transmissions between the underwater vehicle 2 and various other components of the mine detection system. In a preferred embodiment, a precision timing signal is transmitted between the buoy 8 (described below) and the vehicle 2, in either direction, over the communications cable 3 to provide a start-of-ping timing reference. The communications cable 3 may comprise any material suitable for transmitting data, such as optical fiber cable or the like. The communications cable may be coiled or wound to fit into a pack for easy payout of the cable. The communications cable 3 may comprise any width and length deemed suitable by those skilled in the art. In one preferred embodiment, the payed out length of the communications cable ranges from about 1 to about 5000 feet. The communications cable 3 may comprise sections of positive, negative, and neutral buoyancy.

The invention also comprises a buoyant surface unit 5 comprising a protective housing 6 defining an interior chamber 7; ii) a positive buoyancy buoy 8 attached to the housing 6; an antenna system 13 attached to the housing 6; and iv) a radio transmitter and receiver system 10 positioned within the chamber 7.

The protective housing 6 may comprise any suitable waterproof protective material such as plastic, metal, and the like. The protective housing 6 may be present in any form having an interior chamber, such as a box or cylinder. The protective housing 6 may have ends which are independently open or closed. For example, in one preferred embodiment, the protective housing 6 is in the form of a cylinder having a top closed end and a bottom open end. The protective housing 6 may optionally further comprise one or more releasable compartments 14, as shown in FIG. 2. The compartments 14 may be partially formed by internal walls, bulkheads or the like inside the protective housing 6. FIG. 2 shows an embodiment where the interior chamber 7 of the protective housing 6 comprises a parachute compartment 16, which parachute compartment 16 contains a deployable parachute 18. The deployable parachute 18 is preferably attached to the surface unit 5, and serves to slow the descent of the mine detection system 1 as it is deployed into a body of water.

As shown in FIG. 1, the surface unit 5 also comprises a positive buoyancy buoy 8 attached to the protective housing 6. The buoy 8 serves to keep the surface unit 5 afloat at or near a top surface of a body of water. The buoy 8 may comprise any suitable floatation means, such as an inflatable floatation device, or any suitable buoyant material such as styrofoam and the like. The buoy 8 may be attached to the inside or outside of the housing 6, and may be attached using any suitable means such as gluing and the like. The buoy 8 may optionally be stored within a releasable compartment of the surface unit 5. In one preferred embodiment, the buoy 8 comprises an inflatable floatation device which is attached to an outside end of the surface unit 5. FIG. 1 shows the buoy 8 in an inflated condition. FIG. 2 shows the buoy 8 in a collapsed condition. The buoy 8 also preferably comprises a timing measurement system (not shown) which serves to synchronously measure sonar signal transit times or signal phases from the vehicle 2 to each hydrophone of the acoustic receiver array.

An antenna system 13 is also preferably connected to the protective housing 6, most preferably via the buoy 8, which antenna system 13 is capable of receiving and transmitting data between the underwater vehicle 2 and a remote user. Preferably, the antenna system 13 is also capable of receiving global positioning system (GPS) signals from multiple GPS satellites, to thereby transmit surface unit 5 location data to the remote user and use the GPS location data as the reference point for the vehicle positioning system 4. Preferably, the antenna system 13 is attached to the buoy 8 of the surface unit 5, such that the antenna system 13 extends at least partially above the surface of a body of water where the surface unit 5 is located. The antenna system 13 may be attached to the buoy 8 by any convenient means, and it may be present inside or outside of the buoy 8.

The surface unit 5 also comprises a radio transmitter and receiver system 10. The radio transmitter and receiver system 10 is preferably positioned within the interior chamber 7 of the protective housing 6, and is electrically attached to the vehicle positioning system 4 and the antenna system 13. The radio transmitter and receiver system 10 is capable of transmitting surface unit location data, underwater vehicle status and location data collected from the vehicle positioning system 4 to a remote user, via the antenna system 13. It is also capable of receiving commands from the remote user, and transmitting these commands to the vehicle positioning system 4 and the underwater vehicle 2. The radio transmitter and receiver system 10 may comprise any suitable transmitting and receiving components known to those skilled in the art. Preferably, the radio transmitter and receiver system 10 comprises a VHF transmitter, a UHF receiver, a decoder, a diplexer, and a GPS receiver. Such are known in the art. The radio transmitter and receiver system 10 may be attached to the vehicle positioning system 4 by an electrical connector 11 which may comprise a wire or optical fiber cable or the like.

A surface unit remote power source 12, for providing power to the surface unit 5, is attached to the vehicle positioning system 4, and the radio transmitter and receiver system 10. The surface unit remote power source 12 preferably comprises a battery, such as a seawater battery, which is contained within the interior chamber 7 of the surface unit 5. The surface unit remote power source 12 may be attached to these components by any suitable means such as wires or the like.

Likewise, a vehicle remote power source 24 for providing power to the motorized underwater vehicle 2, is preferably located within the vehicle 2. The vehicle remote power source 24 preferably comprises a battery, such as a seawater battery, which is contained within the body of the vehicle 2. The vehicle remote power source 24 may be attached to the vehicle components by any suitable means such as wires or the like. In a most preferred embodiment of the invention, as shown in FIG. 2, all of the components of the mine detection system 1, including the motorized underwater vehicle 2 and the vehicle positioning system 4, are packed into the interior chamber 7 of the surface unit 5. Some or all of the components of the mine detection system 1 may be contained within releasable compartments 14.

In using the mine neutralization system 1 of the present invention, the system 1 is released into a body of water. This may be done using any suitable method such as dropping it from an air vessel such as a plane or helicopter, or releasing it from a sea vessel such as a boat or submarine or the like. Preferably, the mine neutralization system 1 is released by dropping it from an air vessel.

In a preferred embodiment, shown in FIG. 3, a mine neutralization system, whose components are all packed into the interior chamber 7 of the surface unit 5, is dropped from an air vessel 20 into a body of water. As the mine neutralization system falls from the air vessel 20, a parachute 18 is deployed from a parachute compartment 16 of the surface unit 5. The parachute 18 slows the descent of the mine neutralization system 1, and softens the impact as the mine neutralization system 1 hits the water. Once in the water, the underwater vehicle 2 is released from the interior chamber 7 of the surface unit 5. The underwater vehicle 2 conducts a pre-determined search, as determined by a remote user.

The mine neutralization system preferably comprises a navigation computer. The navigation computer receives data from sensor inputs received from various components of the system, nonexclusively including vessel inputs such as target position and speed of sound in water; buoy inputs such as buoy position, vehicle positioning system range, azimuth angle and elevation angle to the vehicle; and vehicle sensor inputs such as heading, depth, altitude, and X & Y velocity over the bottom. Outputs of the navigation computer, such as desired vehicle heading, depth, and/or altitude, are preferably sent to the vehicle guidance control component 19 and used to direct the motion of the vehicle 2. The navigation computer can be located in the controlling air or sea vessel 20, in the buoy 8, or in the vehicle 2. For cases where the buoy 8 and vehicle 2 are expendable, the preferred implementation is to locate the navigation computer in the controlling vessel 20. For cases where the buoy 8 and vehicle 2 must operate autonomously or nearly autonomous from the controlling vessel 20, the preferred implementation is to locate the navigation computer in the buoy 8 or vehicle 2. Data is transmitted from the underwater vehicle 2 to the vehicle positioning system 4 via the communications cable 3. Buoy position data is transmitted from GPS satellites to the vehicle positioning system 4 via the antenna system 13 and the radio transmitter and receiver system 10. This surface unit position data is used as the reference position for the vehicle positioning system 4. The vehicle positioning system 4 then determines the location of the underwater vehicle 2 within the body of water, and sends location data to the radio transmitter and receiver system 10 via the electrical connector 11. Preferably, the acoustic pinger 22 of the underwater vehicle provides an acoustic ping signal to the vehicle positioning system 4 which is attached via the communications cable 3 to the buoyant surface unit 5. The vehicle's ping signal is preferably time synchronized over the communications cable 3 with the buoyant surface unit's acoustic receiver to enable the vehicle locating system to provide accurate range, elevation and azimuth angles from the buoy 8 to the vehicle 2. The radio transmitter and receiver system 10 then sends this data to a remote user via the antenna system 13. Visual images may also be transmitted to the remote user in this manner using one or more cameras 26 of the underwater vehicle 2. The visual images enable the remote user to locate and identify an underwater target 25, and send commands to the underwater vehicle 2 to thereby direct the underwater vehicle 2 toward the underwater target 25. The target 25 is then preferably detonated or otherwise destroyed using an explodable warhead 17 of the underwater vehicle 2, shown in FIG. 3, or by another weapon of the user.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. An underwater vehicle command and locating system comprising:
    a) a motorized underwater vehicle comprising a guidance control component;
    b) a vehicle positioning system attached to the vehicle via a communications cable; and
    c) a buoyant surface unit comprising:
        v) a protective housing surrounding an interior chamber;
        vi) a positive buoyancy buoy attached to the housing;
        vii) an antenna system attached to the housing; and
        viii) a radio transmitter and receiver system positioned within the chamber, which radio transmitter and receiver system is electrically attached to the vehicle positioning system and the antenna system.

2. The vehicle command and locating system of claim 1 further comprising a battery within the chamber of the surface unit, which battery is attached to the vehicle positioning system, and the radio transmitter and receiver system.

3. The vehicle command and locating system of claim 1 further comprising a parachute compartment within the interior chamber of the surface unit, which parachute compartment contains a deployable parachute.

4. The vehicle command and locating system of claim 1 wherein the motorized underwater vehicle comprises an explodable warhead.

5. The vehicle command and locating system of claim 1 wherein the motorized underwater vehicle comprises a camera.

6. The vehicle command and locating system of claim 1 wherein the underwater vehicle is capable of transmitting visual images to a remote user.

7. The vehicle command and locating system of claim 1 wherein the antenna system is capable of receiving and transmitting global positioning system signals.

8. The vehicle command and locating system of claim 1 wherein the radio transmitter and receiver system is capable of transmitting underwater vehicle location data collected from the vehicle positioning system.

9. The vehicle command and locating system of claim 1, wherein the vehicle positioning system comprises an acoustic positioning system.

10. The vehicle command and locating system of claim 1 wherein the communications cable comprises an optical fiber cable.

11. The vehicle command and locating system of claim 1 wherein the communications cable comprises sections of positive, negative, and neutral buoyancy.

12. The vehicle command and locating system of claim 1 wherein the guidance control component comprises a sonar directional system attached to the underwater vehicle.

13. A method for commanding an underwater vehicle, comprising the steps of:
    I) providing an underwater vehicle command and locating system comprising:
        a) a motorized underwater vehicle comprising a guidance control component;
        b) a vehicle positioning system attached to the vehicle via a communications cable; and
        c) a buoyant surface unit comprising:
            i) a protective housing surrounding an interior chamber;
            ii) a positive buoyancy buoy attached to the housing;
            iii) an antenna system attached to the housing; and
            iv) a radio transmitter and receiver system positioned within the chamber, which radio transmitter and receiver system is electrically attached to the vehicle positioning system and the antenna system;

II) deploying the underwater vehicle command and locating system into a body of water;

III) determining the location of the underwater vehicle within the body of water, via the vehicle positioning system;

IV) receiving data from the underwater vehicle, via the radio transmitter and receiver system, which data enables a user to locate an underwater target;

V) communicating with the underwater vehicle to thereby direct the underwater vehicle toward the underwater target; and VI) destroying the underwater target.

14. The method of claim 13 wherein the underwater target is destroyed by the underwater vehicle.

15. An underwater mine detection assembly which comprises:

a) a motorized underwater vehicle comprising a guidance control component;

b) an acoustic vehicle positioning system attached to the vehicle via a communications cable; and c) a buoyant surface unit comprising:

vi) a protective housing surrounding an interior chamber;

vii) a positive buoyancy buoy attached to the housing;

viii) an antenna system attached to the housing;

ix) a radio transmitter and receiver system positioned within the chamber, which radio transmitter and receiver system is electrically attached to the vehicle positioning system and the antenna system;

x) a battery within the interior chamber of the surface unit, which battery is attached to the vehicle positioning system, and the radio transmitter and receiver system; and vi) parachute compartment within the interior chamber of the surface unit, which parachute compartment contains a deployable parachute.

16. The underwater mine detection assembly of claim 15, wherein the motorized underwater vehicle comprises a warhead.

17. The underwater mine detection assembly of claim 15, wherein the motorized underwater vehicle comprises a camera.

18. The underwater mine detection assembly of claim 15, wherein the antenna system is capable of receiving and transmitting global positioning system signals.

19. The underwater mine detection assembly of claim 15, wherein the radio transmitter and receiver system is capable of transmitting underwater vehicle location data collected from the vehicle positioning system.

20. The underwater mine detection assembly of claim 15, wherein the communications cable comprises an optical fiber cable.

21. The underwater mine detection assembly of claim 15, wherein the guidance control component comprises a sonar directional system attached to the underwater vehicle.

* * * * *